United States Patent
Zeppenfeld et al.

(10) Patent No.: US 11,249,031 B2
(45) Date of Patent: Feb. 15, 2022

(54) INSPECTION SYSTEM AND METHOD FOR ANALYSING DEFECTS

(71) Applicant: Heinrich Georg GmbH Maschinenfabrik, Kreuztal (DE)

(72) Inventors: Arian Zeppenfeld, Olpe (DE); Günter Klappert, Kreuztal (DE); Jost Friedrich, Hilchenbach (DE); Volker Loth, Freudenberg (DE)

(73) Assignee: HEINRICH GEORG GMBH MASCHINENFABRIK, Kreuztal (DE)

( * ) Notice: Subject to any disclaimer, the term of this patent is extended or adjusted under 35 U.S.C. 154(b) by 0 days.

(21) Appl. No.: 16/170,742

(22) Filed: Oct. 25, 2018

(65) Prior Publication Data

US 2019/0128819 A1    May 2, 2019

(30) Foreign Application Priority Data

Oct. 26, 2017   (EP) .................................... 17198575

(51) Int. Cl.
*G01N 21/89*    (2006.01)
*B07C 1/14*    (2006.01)
(Continued)

(52) U.S. Cl.
CPC .......... *G01N 21/8914* (2013.01); *B07C 1/14* (2013.01); *B07C 5/04* (2013.01); *B07C 5/10* (2013.01);
(Continued)

(58) Field of Classification Search
CPC .. G01N 21/8914; G01N 21/8901; G06T 7/55; G06T 7/0004; G06T 7/0006; G06T 7/60;
(Continued)

(56) References Cited

U.S. PATENT DOCUMENTS 5,305,391 A * 4/1994 Gomibuchi ........ G01N 21/8851
250/223 B
5,337,687 A * 8/1994 Moll ...................... A41H 43/02
112/470.07
(Continued)

FOREIGN PATENT DOCUMENTS

CN    206013644 U  *  3/2017
CN    206013644 U     3/2017
(Continued)

OTHER PUBLICATIONS

European Patent Office, Search Report, Application No. 17198575.7, Mar. 9, 2018, 3 pages.
(Continued)

*Primary Examiner* — Maria E Vazquez Colon
(74) *Attorney, Agent, or Firm* — Quarles & Brady LLP (57) ABSTRACT

The invention relates to a method for analysing defects in transformer laminations using an inspection system, and to an inspection system (24), wherein the inspection system comprises a detection unit (26), a conveyance device (27) and a processing device, wherein the detection unit includes an optical detecting device (31), wherein the conveyance device is used to continuously transport a plurality of transformer laminations (25) relative to the detecting device, wherein the detecting device is arranged transversely, preferably orthogonally, to a direction of movement of a transformer lamination, wherein a velocity of movement of a transformer lamination relative to the detecting device is measured via a measurement device (40) of the detection unit, wherein an image of a contour of a transformer lamination is captured with the detecting device, wherein images of a transformer lamination are assembled into a combined image of the transformer lamination via the processing device while considering the velocity of movement of the transformer lamination, wherein a shape of the
(Continued)

transformer lamination is determined on the basis of the combined image via the processing device.

22 Claims, 5 Drawing Sheets

(51) Int. Cl.
    *G06T 7/00*     (2017.01)
    *G06T 7/55*     (2017.01)
    *H01F 41/02*     (2006.01)
    *B07C 5/10*     (2006.01)
    *G01B 11/24*     (2006.01)
    *B07C 5/04*     (2006.01)
    *G01B 11/04*     (2006.01)
    *G06T 7/60*     (2017.01)

(52) U.S. Cl.
    CPC .............. *G01B 11/04* (2013.01); *G01B 11/24* (2013.01); *G01B 11/2433* (2013.01); *G01N 21/8901* (2013.01); *G06T 7/0004* (2013.01); *G06T 7/0006* (2013.01); *G06T 7/55* (2017.01); *G06T 7/60* (2013.01); *H01F 41/0233* (2013.01); *G01B 2210/52* (2013.01); *G06T 2207/20221* (2013.01)

(58) Field of Classification Search
    CPC ... G06T 2207/20221; B07C 1/14; B07C 5/04; B07C 5/10; G01B 11/04; G01B 11/24; G01B 11/2433; G01B 2210/52; H01F 41/0233

See application file for complete search history.

(56) References Cited

U.S. PATENT DOCUMENTS

| | | | | |
|---|---|---|---|---|
| 8,337,687 | B2 * | 12/2012 | Linde | C25D 3/04 148/423 |
| 2008/0235971 | A1 * | 10/2008 | Sakai | G01B 11/04 33/702 |
| 2010/0189135 | A1 * | 7/2010 | Garneau | H04J 3/0661 370/498 |
| 2010/0260378 | A1 * | 10/2010 | Noy | G06T 7/12 382/103 |
| 2011/0222725 | A1 * | 9/2011 | Mitsushio | G06T 7/0004 382/103 |
| 2013/0077650 | A1 * | 3/2013 | Traxler | G06T 7/0004 374/5 |
| 2018/0006509 | A1 * | 1/2018 | Kato | H02K 1/276 |
| 2018/0047151 | A1 | 2/2018 | Seitz et al. | |

FOREIGN PATENT DOCUMENTS

| | | |
|---|---|---|
| DE | 3400981 A1 | 10/1985 |
| DE | 202013105825 U1 | 1/2014 |
| JP | S60106610 A | 6/1985 |
| JP | H03248047 A | 11/1991 |
| JP | H04260517 A | 9/1992 |
| JP | H07209207 A | 8/1995 |
| JP | H08136463 A | 5/1996 |
| JP | 2001334545 A | 12/2001 |
| JP | 2002080121 A | 3/2002 |
| JP | 2006208297 A * | 8/2006 |
| JP | 2006208297 A | 8/2006 |
| JP | 2008224347 A | 9/2008 |
| JP | 2010085347 A | 4/2010 |
| JP | 2012194025 A | 10/2012 |
| JP | 2014215233 A | 11/2014 |
| JP | 2015064217 A | 4/2015 |
| JP | 2016142725 A | 8/2016 |
| JP | 2017173168 A | 9/2017 |
| KR | 101342113 B1 * | 1/2014 |

OTHER PUBLICATIONS

Japan Patent Office, Office Action, Application No. 2018-198795, dated Sep. 8, 2020, 22 pages.

* cited by examiner

INSPECTION SYSTEM AND METHOD FOR ANALYSING DEFECTS

CROSS-REFERENCE TO RELATED APPLICATIONS

This application claims priority to European Patent Application No. 17198575.7 filed on Oct. 26, 2017, the contents of which is hereby incorporated by reference as if set forth in its entirety herein.

The invention relates to an inspection system and a method for analysing defects in transformer laminations with an inspection system, wherein the inspection system comprises a detection unit, a conveyance device and a processing device, wherein the detection unit includes an optical detecting device, wherein the conveyance device is used to continuously transport a plurality of transformer laminations relative to the detecting device, wherein the detecting device is arranged transversely, preferably orthogonally, to a direction of movement of a transformer lamination.

In transformer production, the quality and performance loss of a transformer core, which is assembled from transformer laminations, are impacted significantly by the characteristics of the transformer laminations. In particular, deviations in the geometric shape of a transformer lamination outside of a tolerance range may result in defects regarding the gap and angle of the laminations in the transformer core. Additionally, such deviations may impede the assembly of the transformer core. It therefore is known to remove transformer laminations from a machine for manufacturing transformer laminations after the cutting step and to measure the geometry of the same on an external measuring station. The measurements thus taken can be used to perform adjustments to machine parameters via a system control of the machine, in order to correct the dimensions of the laminations. The disadvantage here is that the machine has to be stopped multiple times, until the shape of the transformer laminations again lies within the required tolerance range. The process of inspecting the transformer laminations and the correction of the machine therefore is very time-consuming and consequently also cost-intensive. Furthermore, this process requires a measuring table, which must be set up in a clean environment with a temperature adjusted to match that at the machine, and which must be calibrated regularly. On the measuring table, the transformer lamination can be captured in its entirety with a camera arranged above the transformer lamination, and can then be measured via image processing by means of reference points. Furthermore, capturing and/or measuring transformer laminations via a plurality of cameras is known. The cameras may be arranged moveably within a fixed coordinate system. It also is known to detect and measure the edges of a transformer lamination via a laser system. Prior to the measurement, the laser is positioned such that it already is arranged in the area of an edge of the transformer lamination to accelerate the detection process. In this case, measuring a transformer lamination thus requires a defined position of the transformer lamination.

Also, a plurality of optical detecting devices of a detection unit can be arranged above a transformer lamination to be inspected, wherein the transformer lamination then can be moved relative to the optical detecting devices. In this way, the space required to install the inspection system can be drastically decreased, as it no longer requires a movement of the detection unit or the optical detecting device relative to a stationary transformer lamination. The images of the transformer lamination recorded with the optical detecting device can be assembled into a combined image of the transformer lamination by means of markings on the transformer lamination. The disadvantage here is that no satisfactory accuracy of the measurement can be achieved and that the velocity of movement of the transformer lamination is comparatively low. For example, at a velocity of movement of the laminations of more than 50 m/min, a measurement accuracy in the range of ≤1:10,000 of the length of a lamination can be achieved for each meter of length at the centre of the lamination. As transformer laminations may be in the range of several meters in length, it is possible to achieve significant cost advantages simply be improving the inspection process.

The technical problem underlying the present invention therefore is to propose a method for analysing defects in transformer laminations with an inspection system, as well as an inspection system, which facilitates a more accurate and cost-effective inspection of transformer laminations.

This problem is solved by a method with the characteristics of claim 1 and an inspection system with the characteristics of claim 14.

In the inventive method for analysing defects in transformer laminations with an inspection system, the inspection system comprises a detection unit, a conveyance device and a processing device, wherein the detection unit includes an optical detecting device, wherein the conveyance device is used to continuously transport a plurality of transformer laminations relative to the detecting device, wherein the detecting device is arranged transversely, preferably orthogonally, to a direction of movement of a transformer lamination, wherein a velocity of movement of a transformer lamination relative to the detecting device is measured via a measurement device of the detection unit, wherein an image of a contour of a transformer lamination is captured with the detecting device, wherein images of a transformer lamination are assembled into a combined image of the transformer lamination via the processing device while considering the velocity of movement of the transformer lamination, wherein a shape of the transformer lamination is determined on the basis of the combined image via the processing device.

The quality and velocity of an inspection of a transformer lamination can be significantly increased with the inventive method. This is achieved by providing a measurement device, with which the velocity of movement of the transformer lamination is measured while said lamination is being captured by the optical detecting device. The fact that at least one contour of the transformer lamination is captured also makes it possible to measure or determine the shape of the transformer lamination. The shape of the transformer lamination is understood here to be a two-dimensional extension of the transformer lamination, that is, its outline. By measuring the velocity of movement of the transformer lamination during the image capture, it is possible to record a plurality of successive images of the transformer lamination and to then assemble the same into a combined image by means of the processing device, that is, using image processing. The processing device in this case specifically assembles the images of the transformer lamination depending on the velocity of movement in such a way that a realistic visual representation of the transformer lamination or its contour is available in the processing device. This visual representation of the transformer lamination then simultaneously corresponds to a representation of the shape of the transformer lamination.

Overall, the velocity of movement of the transformer lamination can also be increased to the degree that this velocity corresponds to the output velocity of a cutting device of a machine for cutting transformer laminations. Incorporating the velocity of movement also helps to achieve a higher measurement accuracy. For example, for a velocity of movement of more than 200 m/min, the shape can be measured exactly to a tolerance range of ≤1:70,000 of the length of the lamination, based on a length of the centre of the lamination of seven meters.

It is insignificant in this context which type of optical detecting device is used. Important is that the optical detecting device is arranged transversely to the direction of movement of the transformer lamination. The images of the contour can be recorded by means of contrast detection via a suitable light reflection off edges of the transformer lamination or with a so-called laser scanner for edge detection. In this process, the optical detecting device at least overlaps the transformer lamination or a width of the transformer lamination such that an adjustment of a plurality of cameras, for example, can be avoided.

In particular, a dimension and/or a contour of the transformer lamination can be determined from the combined image via image processing. For example, a length and a width of the transformer lamination, lengths of individual edges, angles, diameters of openings, their spacing, a curve in the lamination, a position of openings, an edge quality and/or the quality of a cut can be measured or determined. For example, a high accuracy can be achieved in the detection of lamination edges or contours by means of image processing of grey values of the image, or by differentiation of the same. Furthermore, a stability of the transformer lamination and defects in a surface, such as damage, scratches, holes, frayed edges and so on, can be detected and determined by means of a single measurement or, respectively, in a single measurement cycle.

The processing device can associate the captured image with a position of the transformer lamination measured by the measurement device in the direction of movement relative to the detecting device at the capture time. Consequently, an image data set of the image and a position data set of the measured position can be assigned to each other by the processing device in the manner of a synchronisation of image capture, image capture time and velocity of the lamination.

The processing device can store an image data set of the image and a measurement data set of the position in a component data set of the transformer lamination. The component data set can be uniquely assigned to the transformer lamination, for example via a bar code or a colour pattern, such that the transformer lamination already can be immediately recognized by the optical detecting device or the processing device. The component data set also can be used to connect the inspection system with a process-specific infrastructure of a machine, whereby costs can be reduced for quality assurance and any subsequent work steps for producing a transformer core, due to the capability to assign component data to the respective transformer laminations.

Furthermore, the processing device can allocate a consistent time stamp to the image data set of the image and the measurement data set of the position. Having a time stamp guarantees the exact assignment of an image to a capture time as a function of the velocity of movement of the transformer lamination. Furthermore, it is possible to mark a transformer lamination position visualised with an image with the time stamp to determine an exact time of a change of the velocity of movement and to store the same, if necessary.

The processing device also can detect an individual optical marker of the transformer lamination within the image data set of the image and can assign the same to the component data set. The optical marker can be a bar code or a colour pattern on the surface of the transformer lamination, for example. Alternatively, it is possible to apply the optical marker to the already measured transformer lamination by means of a marking device and to subsequently assign the component data set to the defect analysis.

It is advantageous if the processing device determines a placement sequence for a plurality of transformer laminations for producing a transformer core on the basis of the shape of the transformer laminations. Component data, which have been measured and assigned to the transformer lamination, can be used by an appropriate software to keep the size of the placement gaps at the transformer core to a minimum. Thus, a power dissipation of the transformer core can be significantly reduced. Consequently, the processing device can be connected to a partially or fully automated core stacking system of a machine. If the respective transformer laminations are marked, the production of the transformer laminations and the assembly of the transformer laminations to a transformer core can be conducted in machines in separate locations and/or completely independent of each other. The essential aspect of this is that component data sets of the transformer laminations are transmitted to a stacking system, where they can be used to optimise the lamination positioning at a location within the machine where the transformer lamination are set down.

The use of a position sensor and/or a distance sensor of the measurement device makes it possible to measure a position, a distance of completed movement and/or the velocity of movement of the transformer lamination directly at the transformer lamination. Depending on the design of the conveyance device, slippage may occur between the transformer lamination and the transport system if the transport system is a friction-based system, which may result in inaccuracies in the measurement of the velocity of movement. For example, the velocity of movement of a conveyor belt can be determined via an encoder, which is arranged on the drive of the conveyor belt and which creates a velocity profile. In addition, a surface sensor may be provided, which is used for continuous detection of the wear of a conveyor belt by comparing an image of the surface with a reference image, whereby conclusions may be drawn regarding changes in the friction coefficient between the transformer lamination and the surface. The position sensor or, respectively, the distance sensor can also be an optical or a mechanical sensor, which can be used to measure the distance of the completed movement or the velocity of movement of the transformer lamination. In one particularly simple embodiment, the position sensor or, respectively, the distance sensor may comprise a wheel, which makes contact with the transformer lamination, such that a movement of the transformer lamination is directly transferred to the wheel. Additionally, a plurality of position sensors or, respectively, distance sensors may be present, for example, to detect an entry of a transformer lamination into the inspection system or to determine a position of the front and rear end of a transformer lamination. Thus, a distance sensor can be switched on after it detects the front end of the transformer lamination when the transformer lamination enters and can be switched off after it detects to the rear end of the transformer lamination.

The processing device can process measurement data from a position sensor and/or distance sensor placed before the detecting device in the direction of movement and subsequently from a position sensor and/or distance sensor placed after the detecting device in the direction of movement. Consequently, the transformer lamination does not have to rest on the entire length of a continuous conveyance device, but may have different speeds in an end area and in an initial area of the transformer lamination, when the position sensor or distance sensor is not engaged with the transformer lamination before or after the detecting device or when it cannot detect the transformer lamination. If the respective position sensor or distance sensor is neither engaged with the transformer lamination before and after the detecting device nor detecting the transformer lamination, either the sensor before or the sensor after the detecting device can be used as a leading sensor until the same can no longer detect the transformer lamination. With this method, that is, by arranging the respective sensors in this manner, the inspection system can be arranged directly on a machine for cutting transformer laminations. Additionally, the measurement device is able to detect the transformer lamination via the position sensor or distance sensor even when the transformer lamination is stopped or paused because a part of the transformer lamination is still located in a cutting section of the machine and is still being worked on. Thereby, an exact position of an already measured transformer lamination area can be used for an accurate continuation of a measurement when the transformer lamination continues to move forward. Additionally, a transformer lamination can be retracted during a measurement in the course of various cutting programs of the machine, as the processing device will then search for and recognize the most-recently measured transformer lamination position without affecting a measurement result.

It is particularly advantageous if a difference between a velocity of movement measured at one end of the transformer lamination and a velocity of movement measured at an opposite end of the transformer lamination is considered by the processing device in the determination of the shape, preferably while also considering the time of a change of the velocity of movement. This can be made possible if position sensors and/or distance sensors simultaneously detect position or, respectively, distance data of the transformer lamination, which then can be simultaneously processed by the processing device. These position data or, respectively, distance data can be combined by the processing device, such that the exact time of the change in the velocity of movement can be determined along with the position of the transformer lamination at that same time. Thus, a change of a velocity of movement, for example due to the use of two separate conveyor belts, cannot distort a measurement result. In particular, it is possible to conduct a velocity adjustment before and after the optical detecting device in the direction of movement.

To obtain an even more-accurate measurement result, a temperature of the transformer lamination and/or the conveyance device can be measured and can be considered along with a respective expansion coefficient for the determination of the shape by the processing device. For example, a temperature sensor can determine a temperature of an entering transformer lamination and can transmit this temperature value to the processing device. The temperature value of the transformer lamination can be used for a temperature-dependent change in the measured length compared to an ambient temperature in the measurement area or a predefined reference temperature, such as a temperature of the testing area.

The quality of a measurement result can be further improved by measuring a belt tension and/or a friction coefficient of a conveyor belt of the conveyance device and if the same is considered in the determination of the shape by the processing device. In the case of flexible conveyance devices such as conveyor belts, the belt tension can be increased or decreased via a tensioner, wherein the belt tension can then be considered by the processing device. Thus, a changed belt tension may result in a changed friction coefficient of the conveyor belt, which may lead to a difference in velocity between the conveyor belt and the moving transformer lamination. Furthermore, a sensor may be provided, which measures a distance of a lengthening conveyor belt compared to a reference distance, in order to determine a belt tension.

Additionally, it is possible to conduct a calibration of the inspection system via an inspection of a transformer lamination with a known shape. Therein, a reference length of a transformer lamination with exact lamination lengths can be determined prior to putting an inspection system into operation, and ambient data, such as a temperature, a belt tension, a belt surface status, an ambient light, and others can be entered as calibration data into the processing device. The reference length can be recalculated by means of an additional image capture of a transformer lamination at rest, for example in defined time intervals, and can then be entered into the processing device. In this context, a transformer lamination can be measured in a very detailed manner with regards to its shape, wherein a measurement accuracy can be significantly more accurate than a measurement accuracy of the inspection system. It is particularly advantageous if the optical detecting device has a lower thermal expansion coefficient than the transformer lamination to be measured. This will further reduce the potential influence of temperature on a measurement result. Additionally, the component data of the known shape of a transformer lamination used during the calibration can also be used for the calibration of a machine for cutting the transformer lamination.

The inventive inspection system for analysing defects in transformer laminations comprises a detection unit, a conveyance device and a processing device, wherein the detection unit includes an optical detecting device, wherein the conveyance device can be used to continuously transport a plurality of transformer laminations relative to the detecting device, wherein the detecting device is arranged transversely, preferably orthogonally, to a direction of movement of a transformer lamination, wherein a velocity of movement of a transformer lamination relative to the detecting device can be measured via a measurement device of the detection unit, wherein an image of a contour of a transformer lamination can be captured with the detecting device, wherein images of a transformer lamination can be assembled into a combined image of the transformer lamination via the processing device while considering the velocity of movement of the transformer lamination, wherein a shape of the transformer lamination can be determined on the basis of the combined image via the processing device. The advantageous effects of the inventive inspection system can be found in the description of the advantages of the inventive method.

The optical detecting device may include a line scan camera, wherein a line scan image of the contour of a transformer lamination can be captured with the line scan camera. A line scan camera is understood to be a camera with an arrangement of line sensors in a single line, wherein one line sensor may correspond to one pixel. However, the line scan camera also may have three parallel rows of line sensors, each of which is a respective colour sensor for the primary RGB colours. The line scan camera may have a lens system or may be a contact-image-sensor line scan camera with gradient index lenses. In this context, the line scan camera may extend across the entire width of a transformer lamination, that is, it may have the corresponding length. A high resolution of the line scan camera, which preferably is oriented perpendicular or orthogonal to the transformer lamination, makes it possible to detect and evaluate the cut quality of the contour with the processing device by means of image processing. Additionally, the data volume of a line sensor is significantly lower compared to that of an area scan camera, which makes it possible to quickly process the images of the line scan camera into a combined image in real time during a passage of a transformer lamination. Furthermore, it is possible to design a line scan camera via a suitable arrangement of a plurality of line scan cameras, for example via an offset arrangement of two line scan cameras, which overlap in sections. The arrangement of the line scan cameras can then be considered during image processing, such that their partial images are assembled into the combined image.

The optical detecting device also may include a projection device, wherein the projection device can be designed as a lighting device, which can be used to project light onto the transformer lamination. Thus, a light source can be provided directly at the optical detecting device, in order to improve a contrast at the edges of a transformer lamination and thus to facilitate the detection of a contour. If a line scan camera is designed as an offset arrangement of a plurality of line scan cameras, the projection device also may have light sources that are offset accordingly.

The measurement device may include a position sensor and/or a distance sensor for measuring a position and/or the velocity of movement of the transformer lamination directly at the transformer lamination. For the measurement of a velocity of movement of the transformer lamination, the position sensor or distance sensor particularly may be arranged such that recesses and openings in the transformer lamination affect a measurement as little as possible. For example, the position sensor or, respectively, distance sensor can be arranged on a horizontal sliding device above the transformer lamination or the conveyance device, such that an off-centre position relative to the conveyance device or to a direction of movement also is made possible. Alternatively, it is possible to provide a plurality of sensors, which are arranged transversely to the direction of movement above the conveyance device. A position sensor also can be provided, which detects the arrival of a transformer lamination and signals to the processing device, such that the processing device positions a distance sensor above the transformer lamination via a horizontal sliding device according to the position of the arriving transformer lamination on the conveyance device. Simultaneously, a location of the position sensor can be considered by the processing device during the image processing of the combined image of the transformer. If a position sensor or distance sensor does not transmit a value regarding the transformer lamination, the processing device can determine the time at which the transformer lamination passed the respective sensor. Therefore, it is advantageous if at least the distance sensors are arranged at a spacing before and after the detecting device in the direction of movement, which is not larger than a length of a transformer lamination, as it can then be ensured that at least one distance sensor captures the transformer lamination. At the same time, the conveyance device can then be twice as long as the transformer lamination to be measured.

The conveyance device can be designed with one conveyor belt, two conveyor belts or with transport trolleys. The conveyance device thus can have a continuous conveyor belt, which passes below the optical detecting device. Furthermore, two conveyor belts can be arranged before and after the optical detecting device in a direction of movement. Alternatively, the conveyance device can be designed with transport trolleys, which receive one or a plurality of transformer laminations and can transport the same past the optical detecting device. A transformer lamination then rests on a transport trolley, such that no slippage can occur between the transformer lamination and the conveyance device. Insofar as the conveyance device includes a conveyor belt, it is advantageous if the measurement device includes a position sensor and/or distance sensor for direct measurement of a position, a distance of completed movement and/or a transport velocity of a conveyor belt or of a transport trolley. Even if transport trolleys are used, deviations in the placement may still occur, such that the use of position sensors or distance sensors can also be advantageous in this case.

Specifically, at least one position sensor and/or distance sensor, respectively, can be arranged before and after the detecting device in the direction of movement. If the conveyance device is designed in such a manner that it is split by the detecting device, different friction coefficients of conveyor belts and different wear can result in differences in velocity, for example, which can then be captured with the respective position sensor or, respectively, distance sensor. For example, one position sensor or distance sensor can be provided for a conveyor belt before the detecting device and another for a conveyor belt after the detecting device, which can detect an entry or exit of a transformer lamination and its velocity. For conveyor belts without internal gearing, a velocity of movement of the transformer lamination to be detected can be detected both before and after the detecting device.

It is advantageous to design the conveyor belt with magnets for increasing the friction coefficient of the conveyor belt. Thus, magnets can be integrated in the conveyor belt or can be arranged underneath the conveyor belt, in order to increase the friction coefficient of the transformer lamination on the conveyor belt.

The conveyor belt also can be designed with a gearing, which can engage with a drive wheel of the conveyor belt. The gearing can prevent slippage between the drive wheel of the conveyor belt and the conveyor belt. Furthermore, potential measurement errors due to belt lengthening and temperature differences can be taken into consideration via a sensor, which detects the teeth of the gearing. Such a sensor can be an encoder for detecting gear tooth flanks at an interior side of the conveyor belt, which then can also be used for detecting a velocity of the conveyor belt with comparatively high accuracy.

The conveyor belt can include a centring device for aligning the transformer laminations on the conveyor belt. An arriving transformer lamination can then be aligned approximately in the direction of a direction of movement via the centring device. The centring device can be designed out of guiding elements, which define a path of the laminations oriented parallel to a direction of movement and orthogonal to the optical detecting device to the highest possible degree. Transformer laminations not entering the optical detecting device on a parallel path can be recalculated to a straight path via the image processing conducted in the processing device.

In an alternative embodiment, the transport trolleys can be designed with vacuum cups and/or magnets for holding the transformer laminations, wherein the transport trolleys can be moveable via a linear drive of the conveyance device. A plurality of moveable transport trolleys can be arranged on the linear drive, which can also be designed as a revolving drive, in order to transport transformer laminations past a point below the optical detecting device. The transformer laminations can then be temporarily fixed into position on the transport trolleys via the vacuum cups and/or the magnets or also via dry adhesion. The individual vacuum cups or magnets can be affixed in groups of at least two units on a transport trolley. A transport trolley can conduct a straight movement in a direction of movement electrically or pneumatically, as well as mechanically. A velocity of a transport trolley can be adjusted variably, corresponding to the necessary feed rate for the transformer lamination to be measured. Transport trolleys also can be arranged and set up such that they are designed to drive adjacent to each other in parallel. Furthermore, a transfer from one transport trolley to the next transport trolley can be conducted during a run of the transport trolleys, that is, during the conveyance movement, without resulting in a change of velocity of the conveyed transformer lamination. The transport trolleys also can be moved back and forth, whereby the vacuum cups and/or magnets then release or fix the respective transformer laminations into place.

Furthermore, the measurement device can include a temperature sensor for detecting a temperature of a transformer lamination and/or the conveyance device, in order to, for example, detect an actual temperature of an arriving transformer lamination and to transmit the same to the processing device.

Other advantageous embodiments of an inspection system can be found in the descriptions of the characteristics of the dependent claims referencing the independent claim 1.

In the following, preferred embodiments of the invention are explained in more detail with reference to the attached drawings.

The drawings show:

FIG. 1 shows a top view of a transformer lamination 10, the shape of which primarily is determined by an outer contour 11 and by dimensions not included in detail here. The contour 11 and the dimensions are determining factors for a geometry of the transformer lamination 10.

Figure 1:
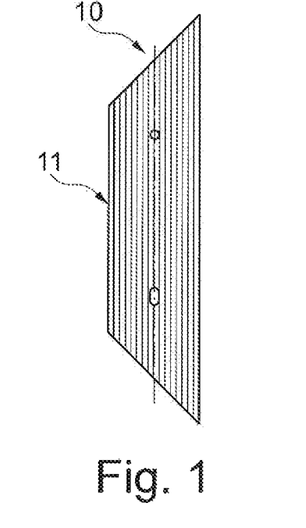
FIG. 1 A top view of a transformer lamination in a first embodiment
Figure 2:
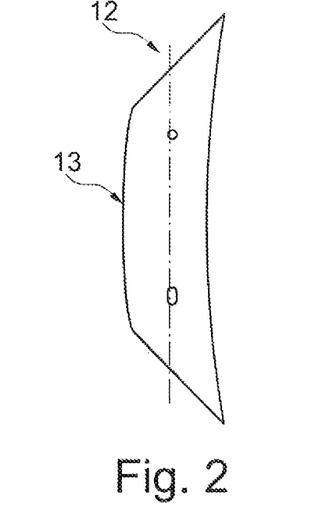
FIG. 2 A top view of a transformer lamination in a second embodiment

FIG. 2 shows a transformer lamination 12 with a contour 13 cut in a slight curve.

Figure 3:
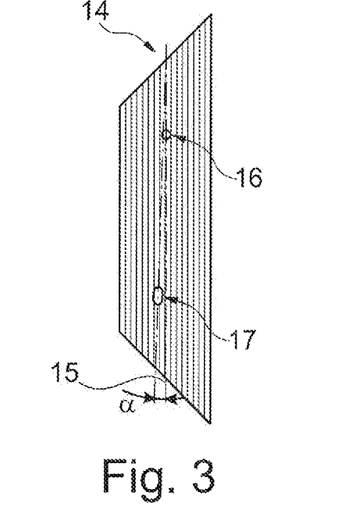
FIG. 3 A top view of a transformer lamination in a third embodiment

FIG. 3 shows a transformer lamination 14 with a longitudinal axis 15 and drill hole 16 positioned on the longitudinal axis 15. An elongated hole 17 is provided on the transformer lamination 14 with an offset by an angle α relative to the longitudinal axis 15.

Figures 4, 5:
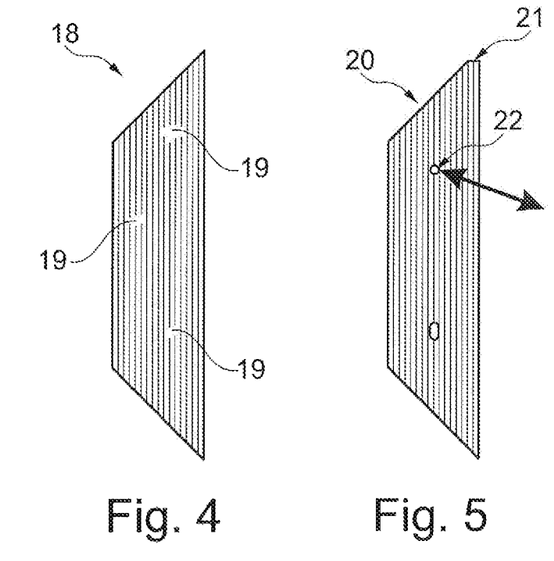
FIG. 4 A top view of a transformer lamination in a fourth embodiment
FIG. 5 A top view of a transformer lamination in a fifth embodiment

FIG. 4 shows a transformer lamination 18 with the irregular openings 19 provided in the transformer lamination 18.

Figure 6:
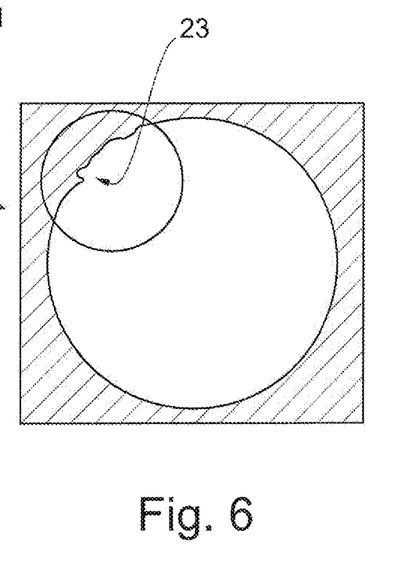
FIG. 6 A detail view from FIG. 5

FIGS. 5 and 6 show a transformer lamination 20 with a cut end 21 and a drill hole 22, whose interior edge 23 is cut imperfectly.

The transformer laminations shown in FIGS. 1 to 6 in this case show characteristics, which are determining factors for a shape of the respective transformer lamination and which can be determined or measured with an inspection system described in the following.

Figure 7:
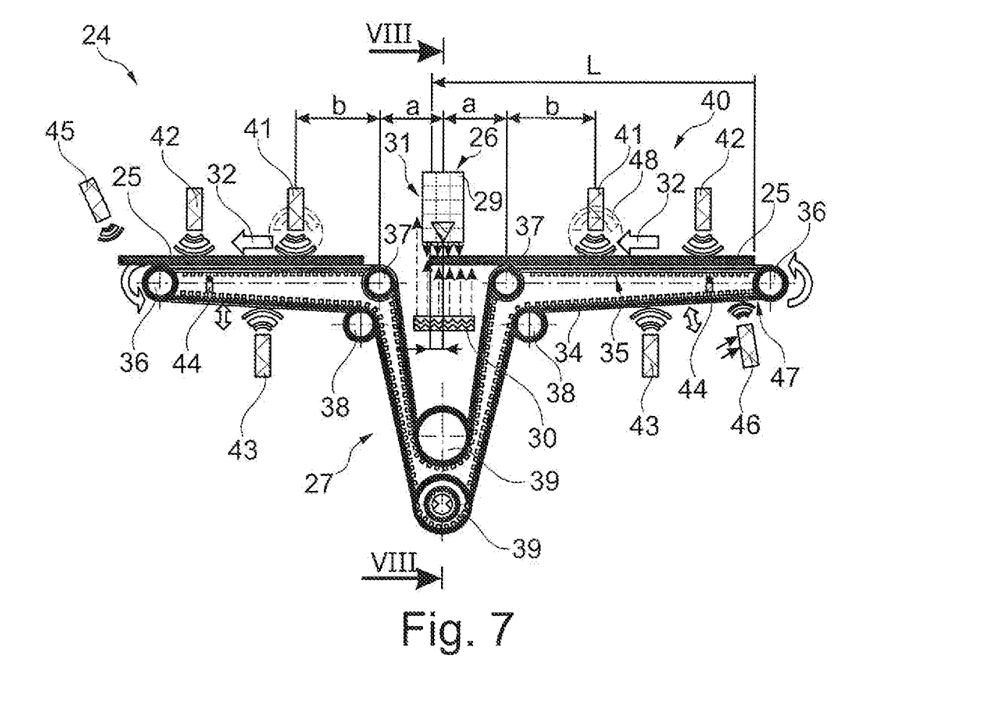
FIG. 7 A sectional view of an inspection system in a first embodiment along a line VII-VII from FIG. 8
Figure 8:
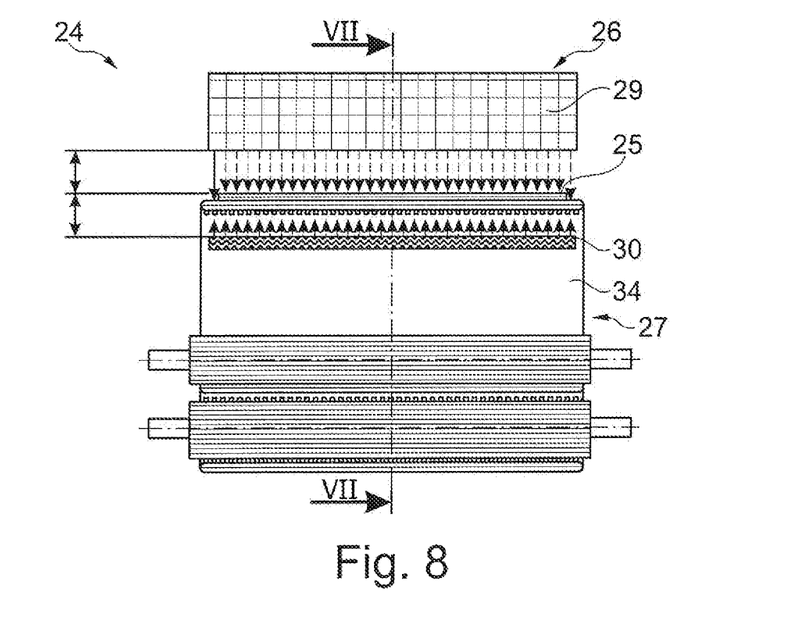
FIG. 8 A sectional view of an inspection system along a line VIII-VIII from FIG. 7
Figure 9:
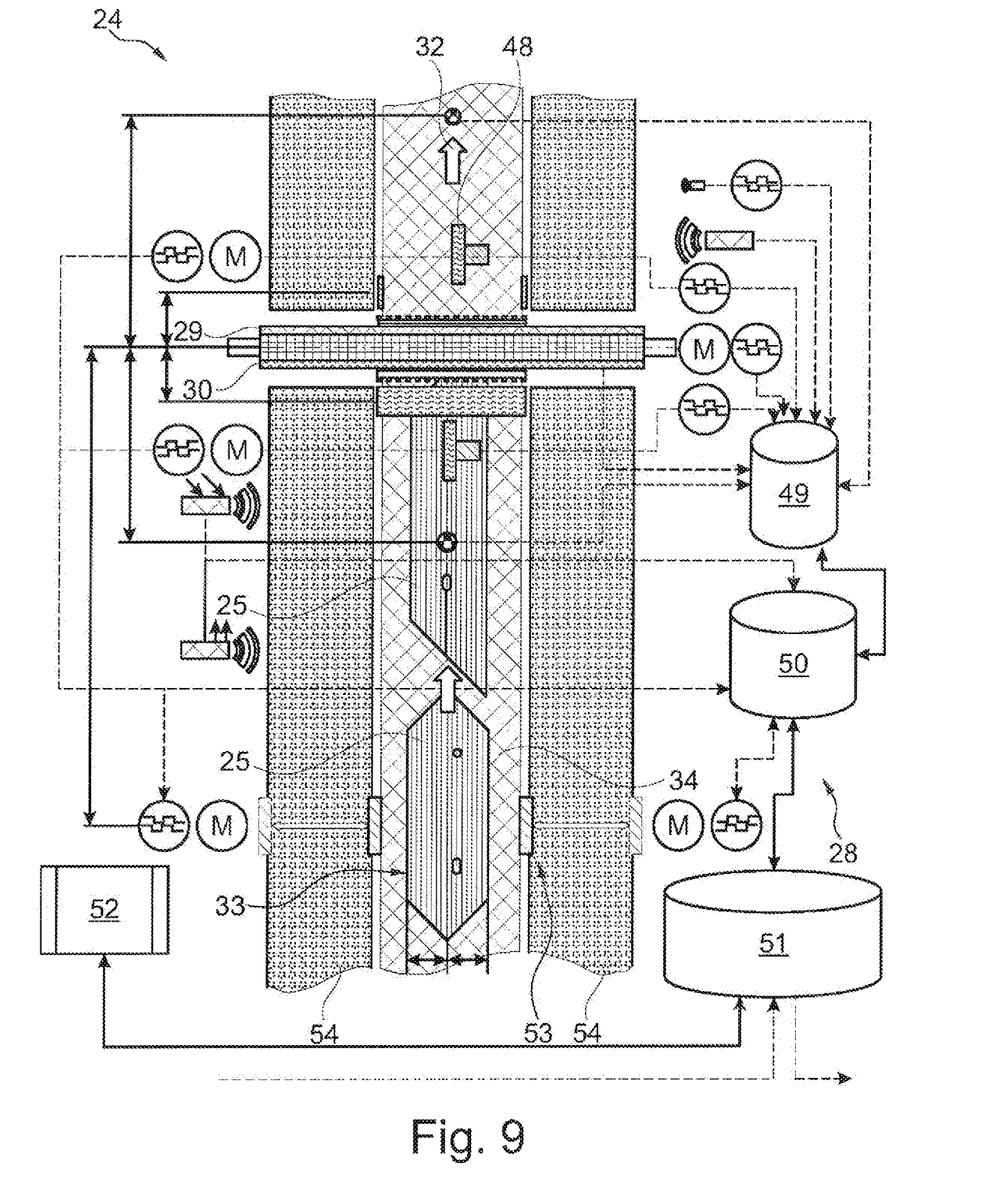
FIG. 9 A top view of an inspection system from FIG. 7

An overall view of FIGS. 7 to 9 shows an inspection system 24 for detecting defects in transformer laminations 25 with a detection unit 26, a conveyance device 27 and a processing device 28. The detecting device 26 is composed of a line scan camera 29 and a lighting device 30, which together compose an optical detecting device 31. In particular, the optical detecting device 31 is arranged transversely or orthogonally to a direction of movement of the transformer laminations 25, marked with an arrow 32 here. Light emitted by the lighting device 30 falls onto the line scan camera 29, such that a contour 33 of a transformer lamination 25 inserted between the line scan camera 29 and the lighting device 30 can be detected by the line scan camera 29 by capturing an image. A plurality of images captured in series can then be assembled by the processing device 28 to a combined image of the transformer lamination 25, wherein the combined image can be used to determine or measure a shape of the transformer lamination 25.

The conveyance device 27 is designed from a continuous conveyor belt 34, wherein the conveyor belt 34 is designed with a gearing 35, which engages with at least one of the drive wheels 36, 37, 38 and 39. Furthermore, a measurement device 40 of the detecting device 26 is provided, which can be used to measure a velocity of movement of a transformer lamination 25 relative to the optical detecting device 31. The measurement device 40 in particular comprises two distance sensors 41 for measuring a distance of completed movement of a transformer lamination 25. Furthermore, the measurement device 40 comprises two position sensors 42, which serve to detect a transformer lamination 25. The belt tension of the conveyor belt 34 is measured via the sensors 43 of the measurement device 40. Encoders 44 serve to detect a velocity of movement of the conveyor belt 34 by counting the gearing 35. In addition, the measurement device 40 comprises temperature sensors 45 for measuring an actual temperature of the transformer lamination 25. A sensor 46 is provided on the conveyor belt 34 for measuring or inspecting a surface 47 of the conveyor belt 34.

The optical detecting device 31 is arranged in the centre between the drive wheels 37 at a relative spacing a, wherein the distance sensors 41 also are arranged in an identical relative spacing b from the drive wheels 37. An overall length L of the transformer lamination 25 is not larger than the lengths 2a+2b. Thus, the transformer lamination 25 always is detected by one of the distance sensors 41. The distance sensors 41 can be optical or mechanical sensors, wherein the distance sensors 41 can then also each include a wheel 48, which is only indicated as an example here.

The processing device 28 here comprises an image processing unit 49 and a measurement processing unit 50, which can be connected to an SPS system 51 of a machine for producing transformer cores. Furthermore, a database 52 for processing component data sets of the respective transformer laminations 25 can be coupled with the SPS system 51.

A centring device 53 is designed for arranging the transformer laminations 25 on the conveyor belt 34, wherein said centring device can be positioned at the sliding panels 54 of the conveyance device 27, ensuring an essentially straight entry of the transformer laminations 25 into the optical detecting device 31.

Figure 10A:
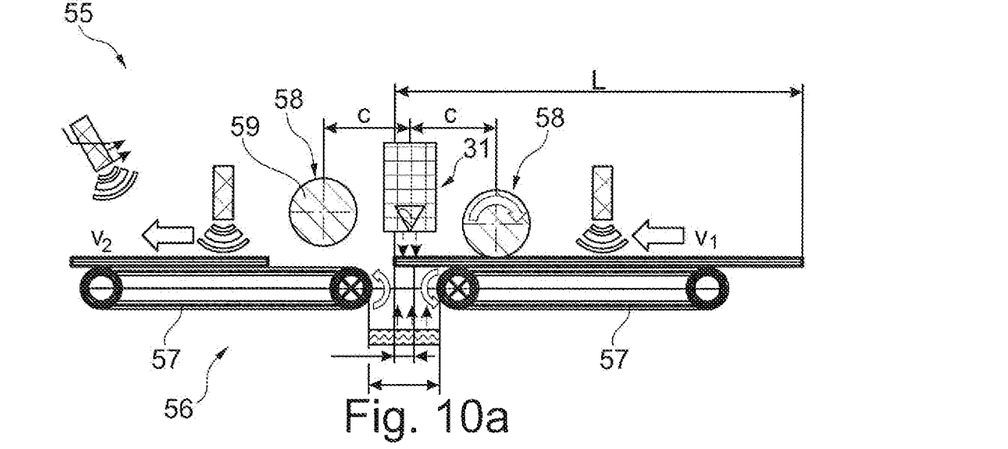
FIG. 10a A sectional view of an inspection system in a second embodiment in a first process step FIG. 10b The inspection system in a second process step FIG. 10c The inspection system in a third process step FIG. 11 A cross-sectional view of an inspection system in a third embodiment FIG. 12 A sectional view of an inspection system in a fourth embodiment FIG. 13 A sectional view of an inspection system in a fifth embodiment
Figure 10B:
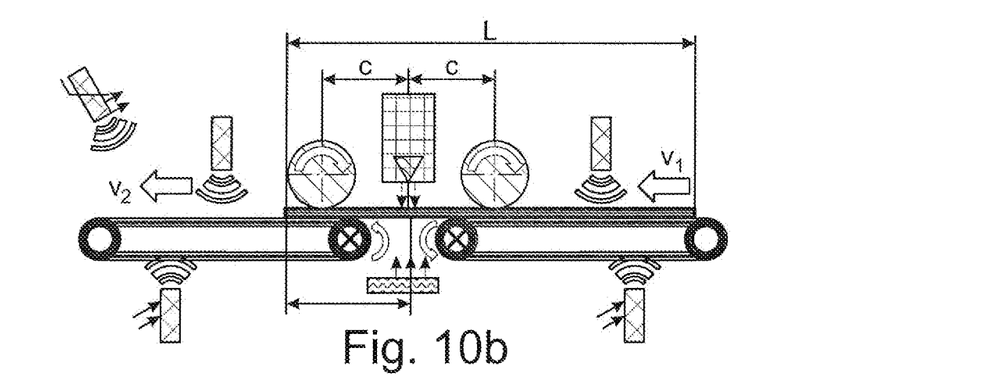
Figure 10C:
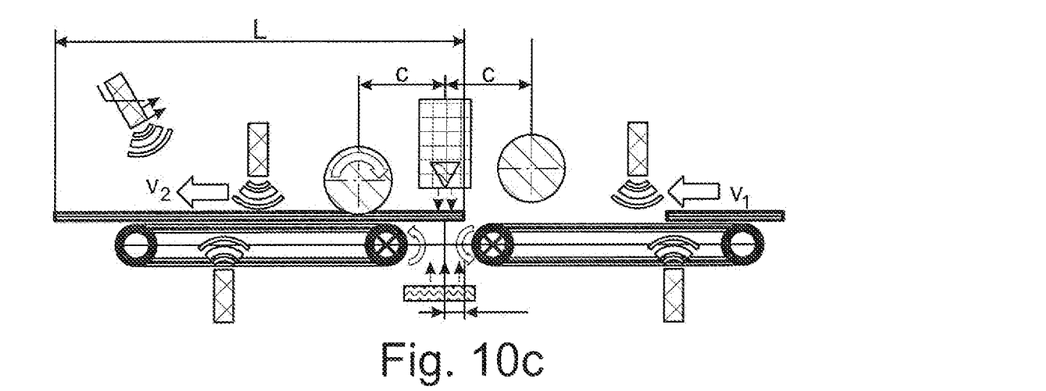

An overall view of FIGS. 10 to 10c shows an inspection system 55, which, unlike the inspection system from FIGS. 7 to 9, includes a conveyance device 56, which is designed with two separate conveyor belts 57. The distance sensors 58 are moveable relative to the transformer laminations 25 by means of a wheel 59 and are arranged in a corresponding spacing c relative to the optical detecting device 31, such that a velocity of movement v1 of the entering conveyor belt 57 can be measured independently of a velocity of movement v2 of the exiting conveyor belt 57 via a contact of the wheel 59 with the transformer lamination 25.

Figure 11:
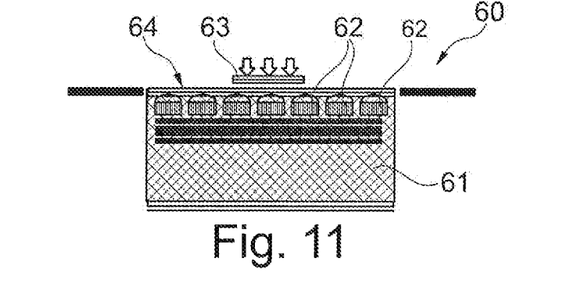

FIG. 11 shows a cross-sectional view of an inspection system 60 with a conveyor belt 61 and magnets 62 arranged below the same, which due to their magnetic force push a transformer lamination 63 against a surface 64 of the conveyor belt 61 and which thus can decrease slippage.

Figure 12:
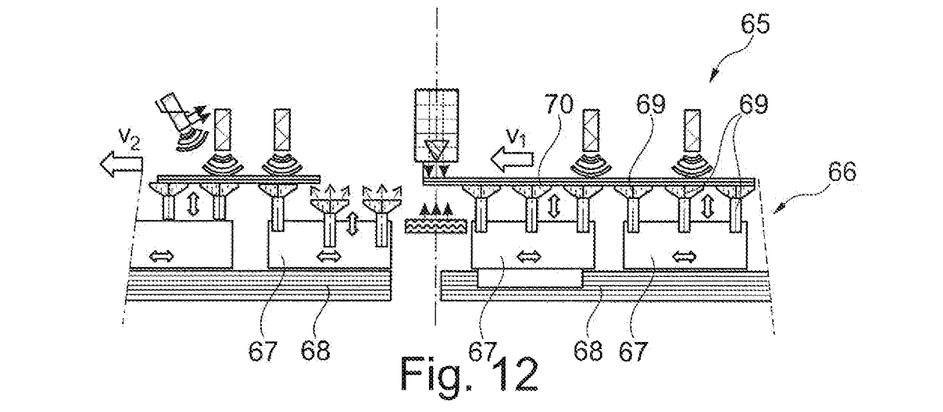

FIG. 12 shows an inspection system 65, whose conveyance device 66 includes transport trolleys 67, which are moveable along a linear drive 68. Vacuum cups 69 are arranged at each transport trolley 67, via which a transformer lamination 70 can be fixed into place and transported. Therein, a transfer of a transformer lamination 70 can be conducted between the transport trolleys 67.

Figure 13:
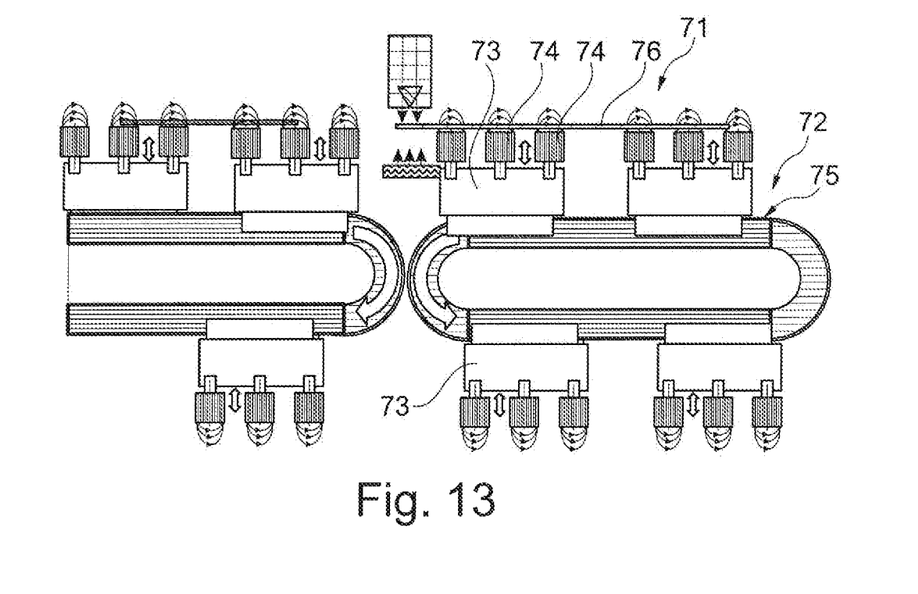

FIG. 13 shows an inspection system 71 with a conveyance device 72, which is designed from transport trolleys 73 with magnets 74. The transport trolleys 73 can be moved along a revolving linear drive 75, wherein the magnets 74 can be electrically switched on and off to fix the transformer laminations 76 into place.

The invention claimed is:

1. A method for analysing defects in transformer laminations with an inspection system, wherein the inspection system comprises a detection unit including an optical detecting device arranged transversely to a direction of movement of a transformer lamination, a measurement device including a position and/or distance device placed before the detecting device in the direction of movement and a position and/or distance device placed after the detecting device in the direction of movement, a conveyance device, and a processing device, comprising the steps of:

continuously transporting a plurality of transformer laminations relative to the optical detecting device;

measuring a velocity of movement of at least one of the plurality of transformer laminations relative to the optical detecting device via the measurement device of the detection unit;

measuring a distance of completed movement and/or the velocity of movement of the at least one of the plurality of transformer laminations directly at the transformer lamination with the optical detecting device;

capturing an image of a contour of the at least one of the plurality of transformer laminations with the optical detecting device;

assembling images of the at least one of the plurality of transformer laminations into a combined image of the transformer lamination via the processing device while considering the velocity of movement of the transformer lamination;

determining a shape of the at least one of the plurality of transformer laminations on the basis of the combined image and a difference between a velocity of movement measured at one end of the at least one of the plurality of transformer laminations and a velocity of movement measured at an opposite end of the at least one of the plurality of transformer laminations via the processing device; and using the processor to process measurement data from the position sensor and/or distance sensor placed before the detecting device in the direction of movement and subsequently from the position sensor and/or distance sensor placed after the detecting device in the direction of movement.

2. The method according to claim 1, further comprising the step of using image processing to determine a dimension and/or a contour of the at least one of the plurality of transformer laminations on the basis of the combined image.

3. The method according to claim 1, further comprising the step of using the processor to associate the captured image with a position of the at least one of the plurality of transformer laminations measured by the measurement device in the direction of movement relative to the detecting device at a capture time.

4. The method according to claim 3, further comprising the step of using the processor to store an image data set of the image and a measurement data set of the position in a component data set of the at least one of the plurality of transformer laminations.

5. The method according to claim 4, further comprising the step of using the processor to allocate a consistent time stamp to the image data set of the image and the measurement data set of the position.

6. The method according to claim 4, further comprising the step of using the processor to detect an individual optical marker of the at least one of the plurality of transformer laminations within the image data set of the image and can assigning the individual optical marker to the component data set.

7. The method according to claim 1, further comprising the step of using the processor to determine a placement sequence for the plurality of transformer laminations for producing a transformer core on the basis of the shapes of the plurality of transformer laminations.

8. The method according to claim 1, wherein the step of determining the shape further comprises measuring a temperature of the at least one of the plurality of transformer laminations and/or the conveyance device and considering the temperature of the at least one of the plurality of transformer laminations and/or the conveyance device along with a respective expansion coefficient.

9. The method according to claim 1, wherein the step of determining the shape further comprises measuring a belt tension and/or a friction coefficient of a conveyor belt of the conveyance device.

10. The method according to claim 1, further comprising the step of calibrating the inspection system via an inspection of a transformer lamination with a known shape.

11. The method according to claim 1, wherein the step of determining the shape further comprises considering a time of a change of the velocity of movement.

12. An inspection system for analysing defects in transformer laminations, wherein the inspection system comprises a detection unit, a conveyance device, a measuring device including a position sensor and/or a distance sensor placed before the detection unit in the direction of movement and a position sensor and/or a distance sensor placed after the detecting device in the direction of movement, and a processing device, wherein the detection unit includes an optical detecting device, wherein the conveyance device is used to continuously transport a plurality of transformer laminations relative to the detecting device, wherein the detecting device is arranged transversely to a direction of movement of the plurality of transformer laminations, wherein a velocity of movement of at least one of the plurality of transformer lamination relative to the detecting device is measured via a measurement device of the detection unit, the measurement device measures a distance of completed movement and/or the velocity of movement of the at least one of the plurality of transformer laminations directly at the at least one of the plurality of transformer laminations with the optical detecting device, an image of a contour of the at least one of the plurality of transformer laminations is captured with the detecting device, images of the at least one of the plurality of transformer laminations are assembled into a combined image of the at least one of the plurality of transformer laminations via the processing device while considering the velocity of movement of the at least one of the plurality of transformer laminations, a shape of the at least one of the plurality of transformer laminations is determined on the basis of the combined image and a difference between a velocity of movement measured at one end of the at least one of the plurality of transformer laminations and a velocity of movement measured at an opposite end of the at least one of the plurality of transformer laminations via the processing device, and measurement data from the position sensor and/or the distance sensor placed before the detecting device in the direction of movement and subsequently from a position sensor and/or distance sensor placed after the detecting device in the direction of movement is processed by the processing device.

13. The inspection system according to claim 12, wherein the optical detecting device includes a line scan camera, wherein a line scan image of the contour of the at least one of the plurality of transformer laminations can be captured with the line scan camera.

14. The inspection system according to claim 12, wherein the optical detecting device includes a projection device, wherein the projection device can be designed as a lighting device, which can be used to project light onto the at least one of the plurality of transformer laminations.

15. The inspection system according claim 12, the conveyance device is designed with one conveyor belt, two conveyor belts or with transport trolleys.

16. The inspection system according to claim 15, wherein the measurement device is configured to measure a position, a distance of completed movement and/or a transport velocity of the conveyor belt or the transport trolley.

17. The inspection system according to claim 15, wherein the conveyor belt is designed with magnets for increasing a friction coefficient of the conveyor belt.

18. The inspection system according to claim 15, wherein the conveyor belt is designed with a gearing, which can engage with a drive wheel of the conveyor belt.

19. The inspection system according to claim 15, wherein the conveyor belt includes a centring device for aligning the plurality of transformer laminations on the conveyor belt.

20. The inspection system according to claim 15, wherein the transport trolleys are designed with vacuum cups and/or magnets for holding the plurality of transformer laminations, wherein the transport trolleys can be moveable via a linear drive of the conveyance device.

21. The inspection system according to claim 12, wherein the measurement device includes a temperature sensor for detecting a temperature of the at least one of the plurality of transformer laminations and/or the conveyance device.

22. The inspection system according to claim 12, wherein the detecting device is arranged orthogonally to a direction of movement of the plurality of transformer laminations.

* * * * *